United States Patent
Ota

(10) Patent No.: US 8,611,764 B2
(45) Date of Patent: Dec. 17, 2013

(54) OPTICAL RECEIVER MODULE

(75) Inventor: Morihiko Ota, Tokyo (JP)

(73) Assignee: NEC Corporation, Tokyo (JP)

( * ) Notice: Subject to any disclaimer, the term of this patent is extended or adjusted under 35 U.S.C. 154(b) by 276 days.

(21) Appl. No.: 13/113,247

(22) Filed: May 23, 2011

(65) Prior Publication Data

US 2011/0286739 A1    Nov. 24, 2011

(30) Foreign Application Priority Data

May 24, 2010 (JP) ................. P2010-118841

(51) Int. Cl.
*H04B 10/00* (2013.01)
(52) U.S. Cl.
USPC ............................ 398/209; 398/208; 398/211
(58) Field of Classification Search
USPC ......................................... 398/208, 209, 211
See application file for complete search history.

(56) References Cited

U.S. PATENT DOCUMENTS 7,308,211 B2 * 12/2007 Miyazaki ..................... 398/208
2003/0223760 A1 * 12/2003 Takahara et al. ............. 398/147

FOREIGN PATENT DOCUMENTS

| JP | 2002-208892 | * | 7/2002 | ............ H04B 10/02 |
| JP | 2002208892 A | | 7/2002 | |
| JP | 2009177237 A | | 8/2009 | |

* cited by examiner

*Primary Examiner* — Nathan Curs

(57) ABSTRACT

An optical receiver module includes an optical receiver that receives and converts a plurality of optical signals depending on different polarized states into a plurality of electric signals, a bit error detector that detects a plurality of bit error rates from electric signals, a maximum value detector that detects a maximum bit error rate among bit error rates, a dispersion compensating controller that calculates a dispersion compensating value based on the maximum bit error rate, and a variable dispersion compensator that performs dispersion compensation against waveform degradation of received optical signals. Thus, it is possible to accurately search for an optimum dispersion compensating value in a transmission line susceptible to polarized dispersion. This makes it possible to stabilize dispersion compensating control on the optical receiver.

2 Claims, 5 Drawing Sheets

OPTICAL RECEIVER MODULE

BACKGROUND OF THE INVENTION

1. Field of the Invention

The present invention relates to optical receiver modules that receive optical signals, and to methods and control programs for reception of optical signals.

The present application claims priority on Japanese Patent Application No. 2010-118841, the content of which is incorporated herein by reference.

2. Description of the Related Art

Patent Document 1 discloses an optical dispersion compensating device including a variable dispersion compensator, a bit error information generator and a controller, which is designed to perform automatic compensation on polarized dispersion of optical signals.

Patent Document 2 discloses another optical dispersion compensating device including a variable dispersion compensator, a bit error information monitor and a controller.

Patent Document 1: Japanese Patent Application Publication No. 2002-208892

Patent Document 2: Japanese Patent Application Publication No. 2009-177237

These technologies are unable to properly search for optimum points in transmission lines susceptible to polarized dispersion of optical signals. This is because signal quality greatly varies due to polarized states in transmission lines susceptible to polarized dispersion of optical signals. Polarized dispersion may lead to erroneous detection of optimum dispersion compensating values due to polarized states; hence, it is very difficult to optimally perform dispersion compensation on optical signals.

SUMMARY OF THE INVENTION

It is an object of the present invention to provide an optical receiver module that is able to properly detect optimum dispersion compensating values irrespective of polarized dispersion of optical signals in transmission lines.

An optical receiver module of the present invention includes an optical receiver that receives and converts a plurality of optical signals depending on different polarized states into a plurality of electric signals, a bit error detector that detects a plurality of bit error rates from electric signals, a maximum value detector that detects a maximum bit error rate among bit error rates, a dispersion compensating controller that calculates a dispersion compensating value based on the maximum bit error rate, and a variable dispersion compensator that performs dispersion compensation against waveform degradation of received optical signals.

An optical reception method of the present invention includes an optical reception procedure for receiving and converting a plurality of optical signals depending on different polarized states into a plurality of electric signals, a bit error detecting procedure for detecting a plurality of bit error rates from electric signals, a maximum value detecting procedure for detecting a maximum bit error rate among the plurality of bit error rates, a dispersion compensation controlling procedure for calculating a dispersion compensating value based on the maximum bit error rate, and a variable dispersion compensating procedure for performing dispersion compensation against waveform degradation of received optical signals.

A control program of the present invention causes a computer to implement an optical reception process on an optical receiver module including an optical receiver that receives and converts a plurality of optical signals depending on different polarized states into a plurality of electric signals. The optical reception process includes a bit error detecting procedure for detecting a plurality of bit error rates from electric signals, a maximum value detecting procedure for detecting a maximum bit error rate among bit error rates, a dispersion compensation controlling procedure for calculating a dispersion compensating value based on the maximum bit error rate, and a variable dispersion compensating procedure for performing dispersion compensation against waveform degradation of received optical signals.

Thus, it is possible to accurately search for an optimum dispersion compensating value in a transmission line susceptible to polarized dispersion. This makes it possible to stabilize dispersion compensating control on the optical receiver.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

First, the precondition of the present invention will be described with reference to FIGS. 4 to 7.

Compared to a 10 Gbps transmission system, a long-distance transmission system with a transmission speed of 40 Gbps (i.e. 40 gigabits per second) is degraded in terms of tolerance of wavelength dispersion (or dispersion tolerance). Since dispersion tolerance varies inversely proportional to the square of bit rates, the 40 Gbps transmission system needs to be designed with a low dispersion tolerance of 100 ps/nm, which is one-sixteenth of a dispersion tolerance of 1,600 ps/nm of the 10 Gbps transmission system. This indicates that a strict management of wavelength dispersion is needed for an optical communication system with wavelength division multiplexing at a high transmission speed of 40 Gbps per wavelength.

Figure 5:
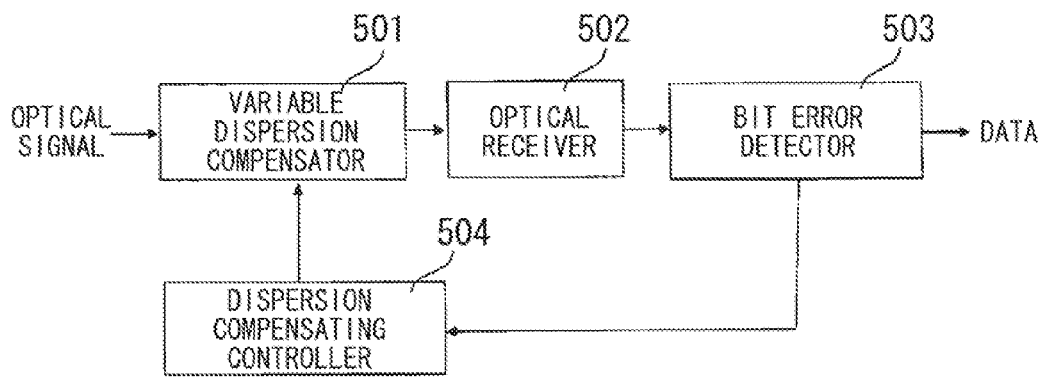
FIG. 5 is a block diagram used for explaining the precondition of the present invention.

As an effective management of wavelength dispersion for a transmission system with a transmissions speed of 40 Gbps or more, it is possible to install a variable dispersion compensator in an optical receiver module. For implementation of optical communication services, each optical receiver module needs to set an optimum dispersion compensating value to each variable dispersion compensator. However, optical fibers presently in place are susceptible to variations of environmental factors such as temperature so that dispersion compensating values may be easily varied over a lapse of time. Considering temperature variations of 0° C. to 65° C., for example, a single-mode fiber of 300 km presents dispersion variations of 40 ps/nm, which is about half of the dispersion tolerance of the 40 Gbps transmission system. Transmission lines having an even greater distance may suffer from communication interruptions. FIG. 5 shows a configuration for solving this drawback, wherein a variable dispersion compensator is subjected to feedback control based on transmission quality information such as bit error rates.

Figure 6:
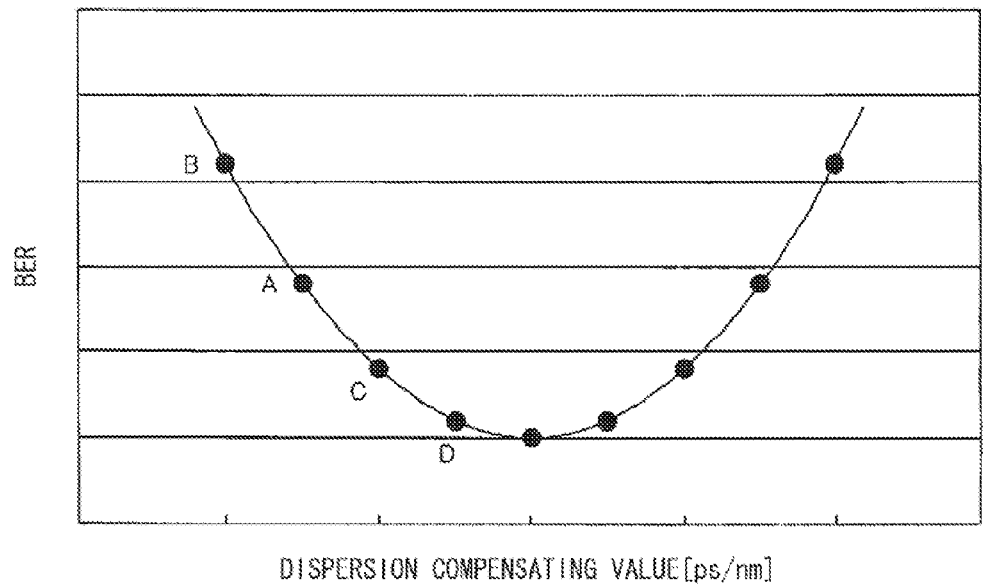
FIG. 6 is a graph used for explaining a dithering algorithm searching for an optimum dispersion compensating value based on detected bit error rates.

In FIG. 5, a variable dispersion compensator 501 compensates for dispersion of received optical signals by use of dispersion compensating values set by a dispersion compensating controller 504. An optical receiver 502 converts optical signals into electric signals. A bit error detector 503 detects a bit error rate from electric signals output from the optical receiver 502. Based on the bit error rate detected by the bit error detector 503, a dispersion compensating controller 504 calculates and sets a dispersion compensating value to the variable dispersion compensator 501. The dispersion compensating controller 504 searches for an optimum dispersion compensating value in accordance with a dithering algorithm, for example. FIG. 6 shows an optimum point search according to the dithering algorithm, wherein A through D denote points of dispersion compensating values. First, bit error rates are detected with respect to dispersion compensating values of points B, C oppositely adjacent to a start point A; subsequently, one of three points A, B, C is selected as the dispersion compensating value indicating the lowest bit error rate. In FIG. 6, point C is selected. Next, bit error rates are detected with respect to dispersion compensating values of points A, D oppositely adjacent to the selected point C; subsequently, one of three points A, C, D is selected as the dispersion compensating value indicating the lowest bit error rate. Herein, point D is selected. In transmission lines not susceptible to polarized dispersion, it is possible to detect an optimum point (i.e. a dispersion compensating value indicating an extreme value of bit error rate, BER) by repeating this procedure.

Figure 7:
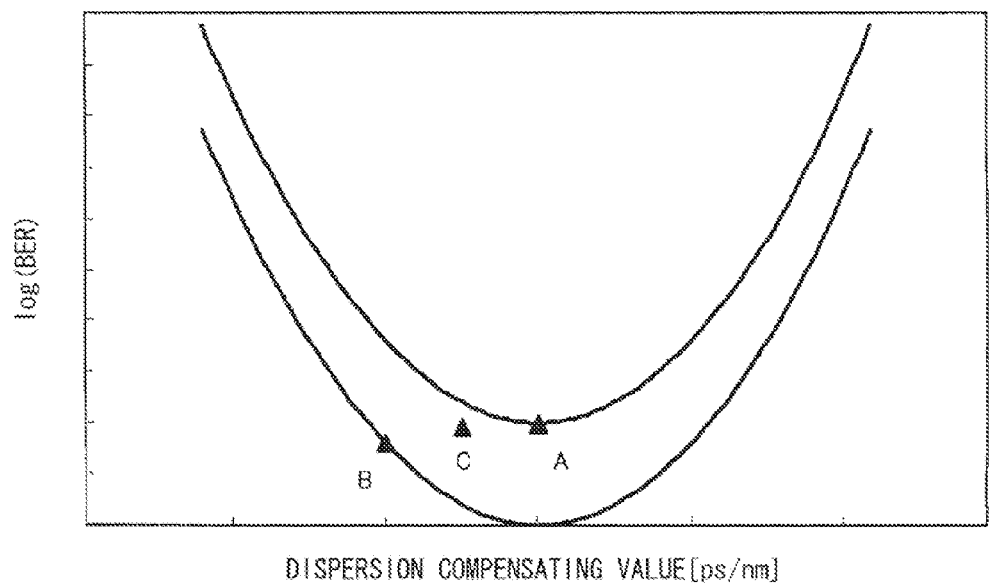
FIG. 7 is a graph showing fluctuations of bit error rates versus dispersion compensating values due to polarized states.

In transmission lines susceptible to polarized dispersion, however, signal quality must be greatly varied due to polarized states. FIG. 7 shows characteristics of dispersion compensating values versus bit error rates in transmission lines susceptible to polarized dispersion. FIG. 7 shows deviations of bit error rates (BER) due to random variations of polarized states. The same dispersion compensating value may cause fluctuations in bit error rates depending on polarized states between two curves shown in FIG. 7. That is, a simple configuration of FIG. 5 may lead to erroneous detection of an optimum dispersion compensating value due to states of polarized dispersion. In the case of FIG. 7, point B may be erroneously detected as the optimum dispersion compensating value. For this reason, it is difficult to perform optimum dispersion compensation.

Figure 1:
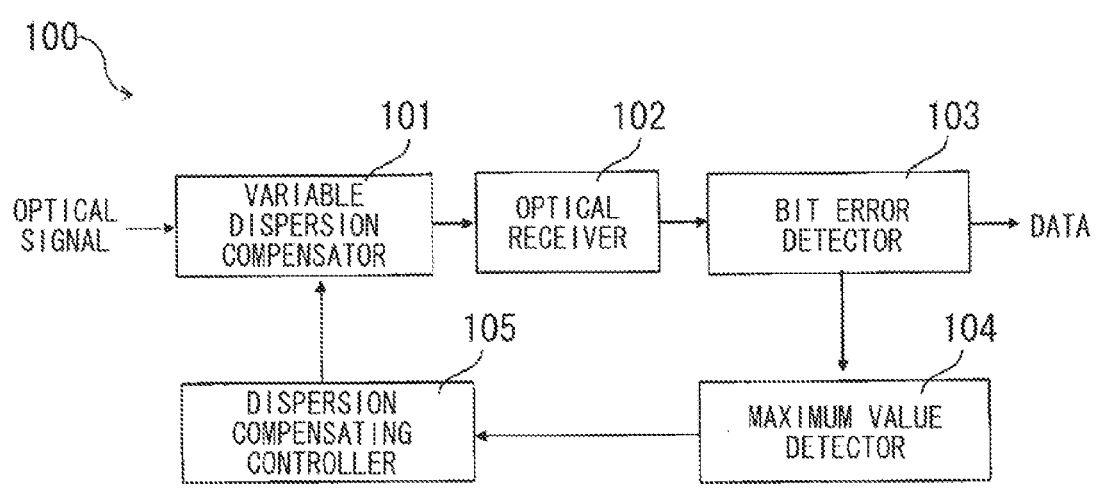
FIG. 1 is a block diagram showing an optical receiver module according to a preferred embodiment of the present invention.

Considering the precondition of the present invention, the present inventor has invented an optical receiver module 100 according to a preferred embodiment shown in FIG. 1.

The optical receiver module 100 includes a variable dispersion compensator 101, an optical receiver 102, a bit error detector 103, a maximum value detector 104, and a dispersion compensating controller 105. The optical receiver 102 receives a plurality of optical signals through different polarized states so as to convert them into electric signals. The bit error detector 103 detects bit error rates from electric signals output from the optical receiver 102. The maximum value detector 104 detects a maximum bit error rate among bit error rates detected by the bit error detector 103. The dispersion compensating controller 105 calculates a dispersion compensating value based on the maximum bit error rate detected by the maximum value detector 104. The variable dispersion compensator 101 perform dispersion compensation against waveform degradation of optical signals received by the optical receiver 102 based on dispersion compensating values calculated by the dispersion compensating controller 105.

The variable dispersion compensator 101 compensates for dispersion of received optical signals by use of dispersion compensating values set by the dispersion compensating controller 105, so that dispersion-compensated optical signals are supplied to the optical receiver 102. The optical receiver 102 converts dispersion-compensated optical signals (output from the variable dispersion compensator 101) into electric signals, which are subsequently supplied to the bit error detector 103. The bit error detector 103 detects bit errors from electric signals output from the optical receiver 102, so that detected bit error rates are supplied to the maximum value detector 104. Specifically, the bit error detector 103 detects a bit error rate per one sample by use of a plurality of electric signals which the optical receiver 102 has produced by converting optical signals being compensated with the same dispersion compensating value for a certain period of time. The bit error detector 103 repeats this procedure so as to detect bit error rates with respect to n samples (where n denotes an integer). The maximum value detector 104 detects the maximum bit error rate among bit error rates detected for n samples, so that the maximum bit error rate is supplied to the dispersion compensating controller 105. Based on the maximum bit error rate detected by the maximum value detector 104, the dispersion compensating controller 105 calculates and sets a dispersion compensating value to the variable dispersion compensator 101.

Since the optical receiver module 100 of the present embodiment is designed to perform dispersion compensating control based on the maximum bit error rate detected by the maximum value detector 104, it is possible to search for an optimum dispersion compensating value adaptable to transmission lines causing degradation of optical signals due to polarized dispersion.

Figure 2:
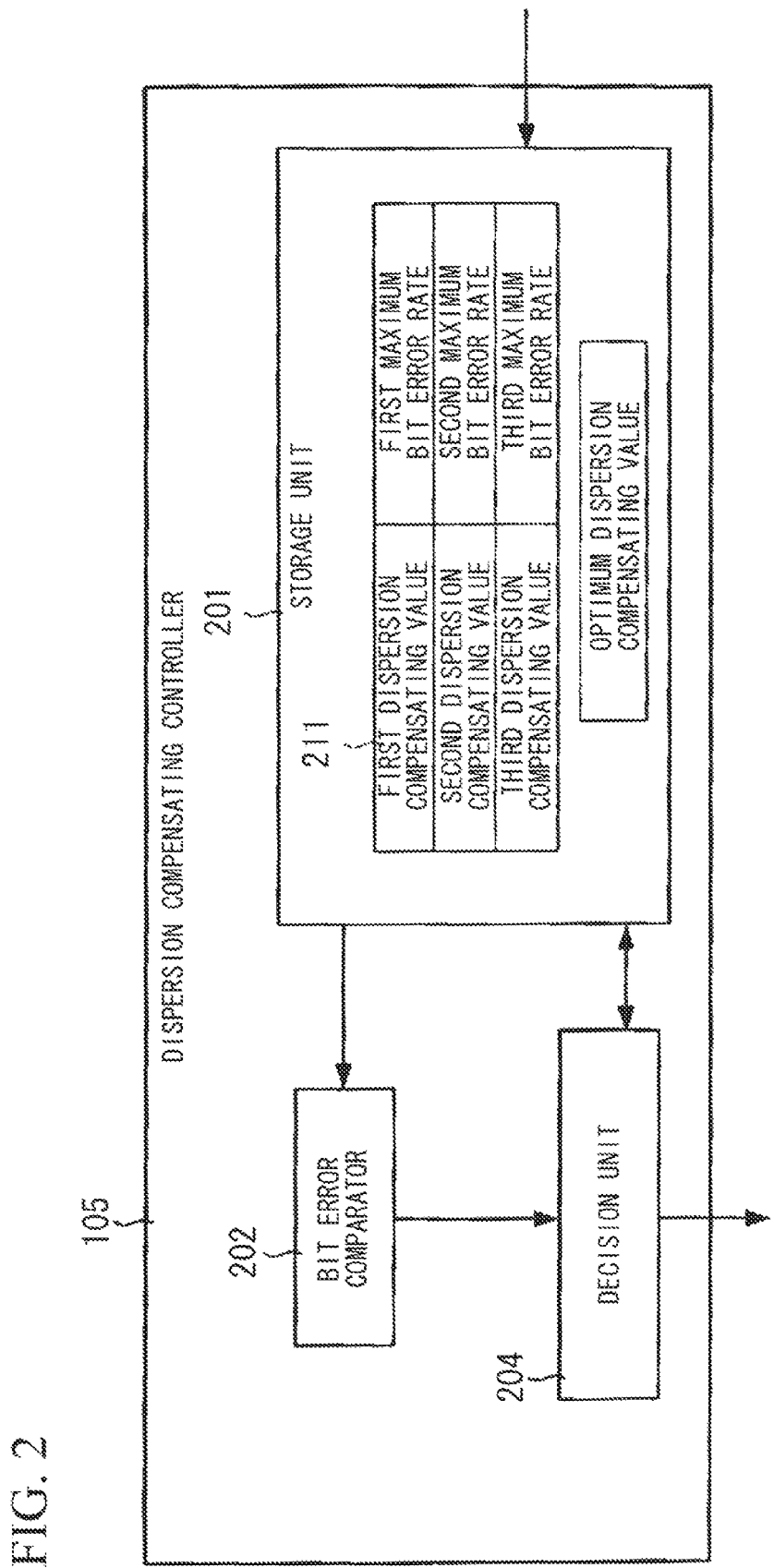
FIG. 2 is a block diagram showing the configuration of a dispersion compensating controller included in the optical receiver module shown in FIG. 1.

FIG. 2 is a block diagram showing the configuration of the dispersion compensating controller 105 included in the optical receiver module 100. The dispersion compensating controller 105 includes a storage unit 201, a bit error comparator 202, and a decision unit 204. The storage unit 201 stores the maximum bit error rate detected by the maximum value detector 104. The storage unit 201 has a table 211 which is able to store three dispersion compensating values and three maximum bit error rates, which are correlated with each other. Specifically, a second dispersion compensating value (representing a peripheral dispersion compensating value) is larger than a first dispersion compensating value (representing a mid dispersion compensating value) by a certain value, whilst a third dispersion compensating value (representing another peripheral dispersion compensating value) is smaller than the first dispersion compensating value by a certain value.

The bit error comparator 202 compares first to third maximum bit error rates stored in the storage unit 201, thus determining a minimum bit error rate among them.

When the minimum bit error rate selected by the bit error comparator 202 is assumed as a maximum bit error rate correlated to a mid dispersion compensating value, the decision unit 204 treats the mid dispersion compensating value as the optimum dispersion compensating value, which is subsequently stored in the storage unit 201. In the following procedures, the variable dispersion compensator 101 performs dispersion compensation based on the optimum dispersion compensating value stored in the storage unit 201.

When the minimum bit error rate selected by the bit error comparator 202 is not assumed as the maximum bit error rate correlated to the mid dispersion compensating value, the decision unit 204 recalculates peripheral dispersion compensating values oppositely adjacent to a mid dispersion compensating value correlated to the minimum bit error rate. When the storage unit 201 does not store the maximum bit error rates correlated to the peripheral dispersion compensating values, the decision unit 204 sets the peripheral dispersion compensating values to the variable dispersion compensator 101.

Figure 3:
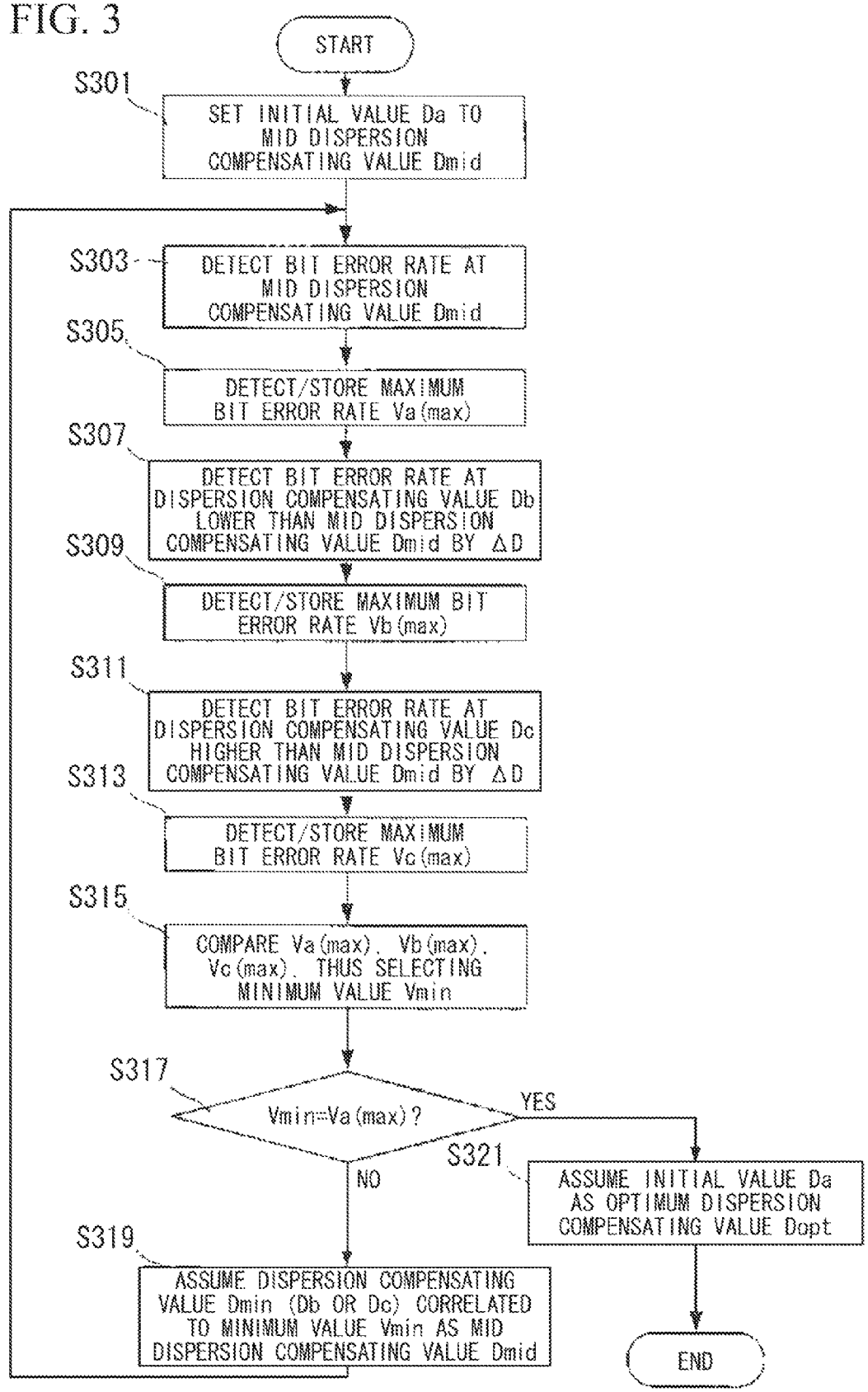
FIG. 3 is a flowchart showing an optical reception process implemented by the optical receiver module shown in FIG. 1.
Figure 4:
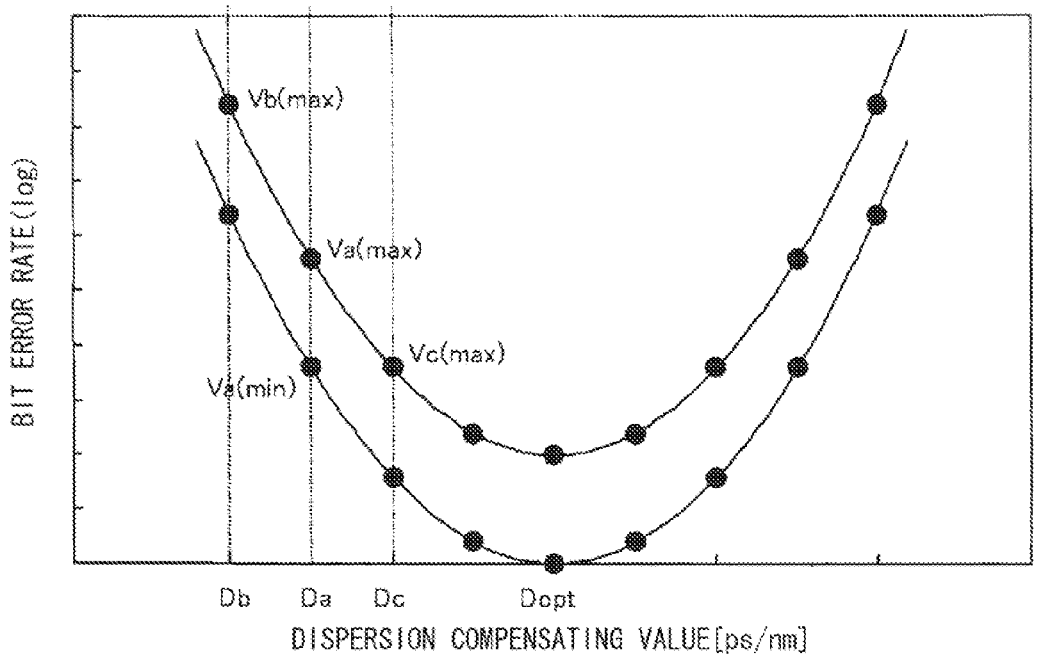
FIG. 4 is a graph showing the relationship between dispersion compensating values and bit error rates in connection with the optical reception process shown in FIG. 3.

Next, an optical reception process implemented by the optical receiver module 100 will be described with reference to FIGS. 3 and 4. FIG. 3 is a flowchart of the optical reception process, and FIG. 4 is a graph showing the relationship between the dispersion compensating value and the bit error rate.

In step S301, an initial value Da of a dispersion compensating value is set to a mid dispersion compensating value Dmid. In step S303, the bit error detector 103 detects a bit error rate at the mid dispersion compensating value Dmid (i.e. the initial dispersion compensating value Da) during a predetermined time T1. At the initial dispersion compensating value Da, the bit error detector 103 detects bit error rates Va ranging from Va(max) to Va(min) depending on polarized states as shown in. FIG. 4.

In step S305, the maximum value detector 104 searches through bit error rates Va detected per n samples during a predetermined time T2 (where T2=T1×n), thus detecting the maximum bit error rate Va(max) at the initial dispersion compensating value Da. Subsequently, the maximum bit error rate Va(max) is stored in the storage unit 201.

In step S307, the dispersion compensating controller 105 sets a dispersion compensating value Db, which is smaller than the mid dispersion compensating value Dmid by a predetermined value AD, to the variable dispersion compensator 101. In step S309, similar to step S305, the maximum value detector 104 detects a maximum bit error rate Vb(max) at the dispersion compensating value Db, wherein the maximum bit error rate Vb(max) is subsequently stored in the storage unit 201. The foregoing steps S307 and S309 do not need to be performed when the storage unit 201 has already stored the maximum bit error rate Vb(max) at the dispersion compensating value Db.

In step S311, the dispersion compensation controller 105 sets a dispersion compensating value Dc, which is larger than the mid dispersion compensating value Dmid by the predetermined value $\Delta D$, to the variable dispersion compensator 101. In step S313, the maximum value detector 104 detects a maximum bit error rate Vc(max) at the dispersion compensating value Dc, wherein the maximum bit error rate Vc(max) is subsequently stored in the storage unit 201. The foregoing steps S311 and S313 do not need to be performed when the storage unit 201 has already stored the maximum bit error rate Vc (max) as the dispersion compensating value Dc.

In step S315, the bit error comparator 202 compares the maximum bit error rates of Va(max), Vb(max), Vc(max), thus selecting a minimum value Vmin among them.

In step S317, the dispersion compensation controller 105 makes a decision as to whether or not the minimum value Vmin is equal to Va(max). When Vmin=Va(max), the flow proceeds to step S321 in which the initial dispersion compensating value Da is assumed as an optimum dispersion compensating value Dopt; then, the dispersion compensation controller 105 exits the optical reception process.

When the minimum value Vmin is not equal to Va(max) in step S317, the flow proceeds to step S319. In step S319, a dispersion compensating value Dmin correlated to the minimum value Vmin (where Dmin=Db or Dc; in FIG. 4, Dmin=Dc) is assumed as the mid dispersion compensating value Dmid; then, the flow returns to step S303. That is, the dispersion compensation controller 105 repeats the foregoing steps S303 through S317, thus exiting the optical reception process upon detecting the optimum dispersion compensating value Dopt.

In this connection, it is preferable that the predetermined value $\Delta D$ (i.e. a difference between the first dispersion compensating value Da and the second/third dispersion compensating value Db/Dc) be gradually decreased every time the decision unit 204 selects the mid dispersion compensating value Dmid. This makes it possible to accurately calculate dispersion compensating values.

The present embodiment is characterized in that the bit error detector 103 is followed by the maximum value detector 104, wherein it is possible to suppress unwanted fluctuations of signal quality due to polarized states of light, and it is therefore possible to accurately detect the optimum dispersion compensating value.

The present invention is applicable to any type of a single device and any type of system configured of plural devices. According to the present invention, control programs implementing the functionality of the present embodiment can be directly applied to optical receiver modules, or they can be applied to optical receiver modules from remote places. In short, the present invention embraces programs which are installed in computers so as to implement the functionality of the present embodiment, digital storage media storing programs, and WWW servers downloading programs to computers.

The present invention is not necessarily limited to the present embodiment, which can be further modified in various ways within the scope of the invention as defined in appended claims. For instance, it is possible to present the following variations.

(1) An optical receiver module includes an optical receiver that receives and converts a plurality of optical signals depending on different polarized states into a plurality of electric signals, a bit error detector that detects a plurality of bit error rates from electric signals, a maximum value detector that detects a maximum bit error rate among bit error rates detected by the bit error detector, a dispersion compensating controller that calculates a dispersion compensating value based on the maximum bit error rate, and a variable dispersion compensator that performs dispersion compensation against waveform degradation of optical signals received by the optical receiver.

(2) The bit error detector detects a bit error rate per one sample based on electric signals that are produced by the optical receiver based on dispersion-compensated optical signals compensated with the same dispersion compensating value for a certain period of time. The bit error detect repeats this procedure to detect bit error rates per n samples (where n is an integer). The maximum value detector detects the maximum bit error rate among bit error rates detected per n samples.

(3) The dispersion compensating controller includes a storage unit that stores first, second and third maximum bit error rates correlated to first, second and third dispersion compensating values, wherein the second dispersion compensating value is higher than the first dispersion compensating value by a predetermined value, whilst the third dispersion compensating value is lower than the first dispersion compensating value by the predetermined value. The dispersion compensating controller further includes an output unit that compares the first, second and third bit error rates so as to select a minimum value among them. The output unit outputs the first dispersion compensating value as the optimum dispersion compensating value when the first bit error rate is assumed as the minimum value. When the second or third bit error rate is assumed as the minimum value, the first dispersion compensating value is replaced with the second or third dispersion compensating value; subsequently, the dispersion compensating controller repeats the foregoing procedures.

(4) It is possible to gradually decrease the predetermined value, representing a difference between the first dispersion compensating value and the second/third dispersion compensating value, every time the dispersion compensating controller repeats the foregoing procedures.

(5) An optical reception method includes an optical reception procedure for receiving and converting a plurality of optical signals depending on different polarized states into a plurality of electric signals, a bit error detecting procedure for detecting a plurality of bit error rates from electric signals, a maximum value detecting procedure for detecting a maximum bit error rate among bit error rates detected in the bit error detecting procedure, a dispersion compensation controlling procedure for calculating a dispersion compensating value based on the maximum bit error rate, and a variable dispersion compensating procedure for performing dispersion compensation against waveform degradation of optical signals received in the optical reception procedure.

(6) A control program causes a computer to implement an optical reception process on an optical receiver module including an optical receiver that receives and converts a plurality of optical signals depending on different polarized states into a plurality of electric signals. The optical reception process includes a bit error detecting procedure for detecting a plurality of bit error rates from electric signals, a maximum value detecting procedure for detecting a maximum bit error rate among bit error rates detected in the bit error detecting procedure, a dispersion compensation controlling procedure for calculating a dispersion compensating value based on the maximum bit error rate, and a variable dispersion compensating procedure for performing dispersion compensation against waveform degradation of optical signals received by the optical receiver.

What is claimed is:

1. An optical receiver module comprising:
   an optical receiver that receives and converts a plurality of optical signals depending on different polarized states into a plurality of electric signals;
   a bit error detector that detects a plurality of bit error rates from electric signals;
   a maximum value detector that detects a maximum bit error rate among bit error rates detected by the bit error detector;
   a dispersion compensating controller that calculates a dispersion compensating value based on the maximum bit error rate; and
   a variable dispersion compensator that performs dispersion compensation against waveform degradation of optical signals received by the optical receiver,
   wherein the dispersion compensating controller further includes a storage unit that stores first, second and third maximum bit error rates correlated to first, second and third dispersion compensating values, wherein the second dispersion compensating value is higher than the first dispersion compensating value by a predetermined value, whilst the third dispersion compensating value is lower than the first dispersion compensating value by the predetermined value, wherein the dispersion compensating controller further includes an output unit that compares the first, second and third bit error rates so as to select a minimum value thereamong, and wherein the output unit outputs the first dispersion compensating value as an optimum dispersion compensating value when the first bit error rate is assumed as the minimum value, while when the second bit error rate or the third bit error rate is assumed as the minimum value, the first dispersion compensating value is replaced with the second dispersion compensating value or the third dispersion compensating value, whereby the dispersion compensating controller subsequently repeats a procedure of storing the first, second and third maximum bit error rates with the storage unit and a procedure of outputting the optimum dispersion compensating value with the output unit.

2. An optical receiver module comprising:
   an optical receiver that receives and converts a plurality of optical signals depending on different polarized states into a plurality of electric signals;
   a bit error detector that detects a plurality of bit error rates from electric signals;
   a maximum value detector that detects a maximum bit error rate among bit error rates detected by the bit error detector;
   a dispersion compensating controller that calculates a dispersion compensating value based on the maximum bit error rate; and
   a variable dispersion compensator that performs dispersion compensation against waveform degradation of optical signals received by the optical receiver,
   wherein the dispersion compensating controller further includes a storage unit that stores first, second and third maximum bit error rates correlated to first, second and third dispersion compensating values, wherein the second dispersion compensating value is higher than the first dispersion compensating value by a predetermined value, whilst the third dispersion compensating value is lower than the first dispersion compensating value by the predetermined value, wherein the dispersion compensating controller further includes an output unit that compares the first, second and third bit error rates so as to select a minimum value thereamong, wherein the output unit outputs the first dispersion compensating value as an optimum dispersion compensating value when the first bit error rate is assumed as the minimum value, while when the second bit error rate or the third bit error rate is assumed as the minimum value, the first dispersion compensating value is replaced with the second dispersion compensating value or the third dispersion compensating value, whereby the dispersion compensating controller subsequently repeats a procedure of storing the first second and third maximum bit error rates with the storage unit and a procedure of outputting the optimum dispersion compensating value with the output unit, and wherein the predetermined value representing a difference between the first dispersion compensating value and the second dispersion compensating value or a difference between the first dispersion compensating value and the third dispersion compensating value is gradually decreased every time the dispersion compensating controller repeats the foregoing procedures.

* * * * *